Dec. 5, 1950  P. G. COX  2,532,441
AIR LINE LUBRICATOR
Filed Oct. 23, 1948
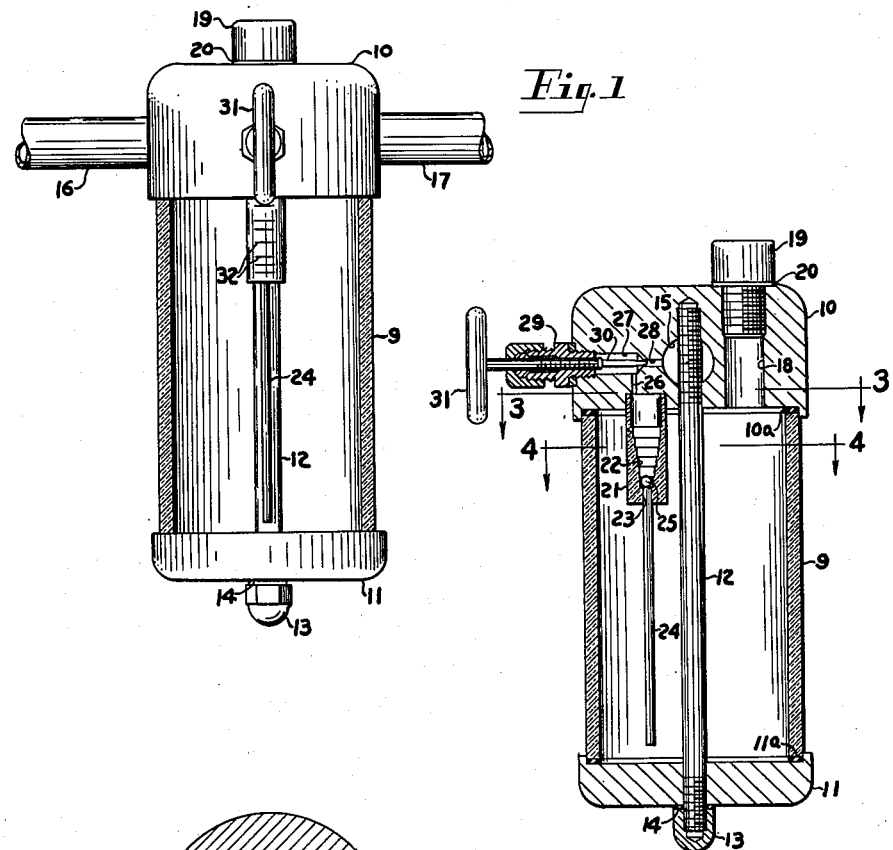
Fig. 1
Fig. 2
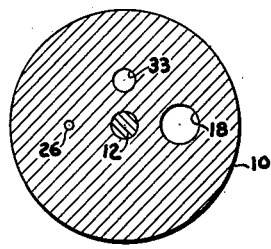
Fig. 3
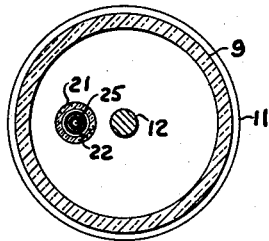
Fig. 4
INVENTOR.
PARKER G. COX.
BY
ATTORNEY.

Patented Dec. 5, 1950

2,532,441

UNITED STATES PATENT OFFICE 2,532,441

AIR-LINE LUBRICATOR

Parker G. Cox, Rochester, N. Y., assignor to Waldo F. Congdon

Application October 23, 1948, Serial No. 56,090

8 Claims. (Cl. 184—55)

1

My invention relates to a new and useful improvement in an air line lubricator adapted for being interposed in an air line so that when the air is delivered to the air driven tool a quantity of lubricant will be carried with the air to the tool. In the use of such air driven tools it is desirable to have a quantity of lubrication carried to the tool but this amount of lubrication carried to the tool will vary, depending upon the size of the tool, working conditions, and the work performed.

It is an object of the present invention to provide an air line lubricator so constructed and arranged that the operator may very easily and quickly adjust the lubricator for delivery of different amounts of lubrication to the air line. Another object of the invention is the provision in an air line lubricator of an indicator associated with the lubricator whereby the amount of lubricant delivered to the air line may be indicated and quickly ascertained by the operator. Another object of the invention is the provision of an air line lubricator of this class which will be simple in structure, economical to manufacture, durable, compact, easily and quickly installed, and highly efficient in use.

Other objects will appear hereinafter.

It is recognized that various modifications and changes may be made in the detail of structure illustrated without departing from the invention and it is intended that such shall be embraced within the scope of the claims which form a part hereon.

Forming a part of this specification are drawings in which:

Fig. 1 is a front elevational view of the invention with the container shown in sections, Fig. 2 is a vertical, longitudinal, sectional view taken at right angles to Fig. 1, Fig. 3 is a sectional view taken on line 3—3 of Fig. 2, Fig. 4 is a sectional view taken on line 4—4 of Fig. 2.

In the invention I have shown the lubricator embodying a bowl or receptacle 9 which is formed from suitable transparent material and which is provided with a cap 10 and a base or bottom 11. A gasket 10a is positioned between the upper edges of the bowl 9 and the cap 10 and a similar gasket 11a is positioned between the lower edge or end of the bowl 9 and the bottom or base 11. Threaded into the cap 10 is a stud or stay bolt 12 which also projects through the bottom or base 11 and is provided with a nut 13 which bears against the gasket 14 so as to securely clamp the portion 9 between the members 10 and 11.

2

Extended diametrically through the cap 10 is an air passage 15 which communicates with the inlet passage 16 and the outlet passage 17. Formed in the cap 10 is also the passage 18 which serves as a filling opening and which is closed by the plug 19 bearing against the gasket 20.

Secured to and depending from the cap 10 and positioned within the bowl 9 is a transparent container 21 having the interior formed of different diameters as at 22, these diameters being stepped upwardly and enlarged as the stepping upwardly proceeds. Formed in the bottom of the container 21 is a passage 23 with which communicates the upper end of a tube 24, the lower end of which terminates adjacent the bottom or base 11. Positioned within the container 21 is a ball 25 which is formed from plastic or other suitable light material but which is not buoyant so that while the ball 25 will sink in the oil contained within the container 21 it will rise with little resistance as the oil passes upwardly through the tube 24 and outwardly from the container 21. This ball 25 does not form a ball valve as it does not serve to close the upper end of the tube 24 but is merely an indicator positioned within the container 21.

The upper end of the container 21 communicates with a passage 26 formed in the head 10. This passage 26 communicates with a chamber 27 which is in communication through the passage 28 with the air passage 15. The communication of the chamber 27 with the passage 28 may be regulated by the needle valve 30 which is carried by the fitting 29 and which may be rotated by the stem 31. Formed on the container 21 are graduations 32 which are visible through the transparent bowl 9. Formed in the cap 10 is a passage 33 which communicates with the interior of the bowl 9 and also with the air passage 15 in front of the stay bolt or post 12.

The construction is such that when the lubricant is deposited within the bowl 9 so that the lower end of the tube or part 24 is submerged below the level of the oil and air is delivered under pressure through the air passage 15 a part of the air will be deflected and will pass through the passage 33 into the bowl 9 so as to set up a pressure above the lubricant contained within the bowl 9 and thus forcing the lubricant upwardly through the tube 24. As the air passes through the passage 15 it will also set up a syphonage in the passage 28 so as to draw the lubricant therethrough. As the lubricant passes outwardly from the container 21 to the passage 28 the ball 25 will rise in order to afford a clearance for the lubricant passing upwardly so that the lubricant may pass around the ball 25. As the quantity of lubricant delivered outwardly through the passage 28 is increased, the ball 25 will rise to the upper spaces which are of greater diameter so as to allow a larger quantity of liquid to pass around the ball 25. The location of the ball 25 will be indicated by the graduations 32 formed on the container 21 and this location may be seen by the operator through the transparent container 21 and the transparent bowl 9. The operator, by adjusting the needle valve 30, may regulate the quantity of lubricant passing through the passage 28 and the indicator ball 25 will indicate the amount of lubricant that is passing outwardly through the passage 28, thus clearly indicating to the operator the adjustment which has been made.

In this way the operator is able to ascertain at all times the amount of flow of lubricant passing to the tool. The result is that the tool driven by the air is always provided with the proper amount of lubricant and thus a highly efficient operation of the mechanism is effected.

In lubricators of this class, where an air passage is provided, it is customary to provide an air passage of such a shape as to form a Venturi tube, so that there is a constricted portion intermediate the ends of the air passage. In the present construction I do not find this necessary, as the air passage 15 is a plain drilled passage of uniform diameter throughout its length. However, by using the member 12 to secure the top 10 and the bottom 11 together and projecting this member 12 through the air passage, I provide the necessary obstruction so that there is a restriction in the air passage, and I thus obtain all of the effect of a venturi.

What I claim is:

1. In an air line lubricator of the class described, embodying a transparent bowl, a cap and a bottom on said bowl, and said cap having an air passage formed therethrough; a liquid container mounted within said bowl and adapted for receiving at one end lubricant from said bowl, and communicating at its opposite end through a passage in said head with said air passage, said container being of increasing inside diameter proceeding from its liquid receiving end to its opposite end; and a non-buoyant member loosely positioned in said container and adapted for being moved in said container to various positions of inside diameter of said container in response to the quantity of flow of liquid through said container.

2. In an air line lubricator of the class described, embodying a transparent bowl, a cap and a bottom on said bowl, and said cap having an air passage formed therethrough: a liquid container mounted in vertical position within said bowl and adapted for receiving at its lower end lubricant from said bowl, and communicating at its upper end through a passage in said head with said air passage, said container being of increasing inside diameter proceeding from its lower end to its upper end; and a non-buoyant member loosely positioned in said container and adapted for being moved in said container to various positions of inside diameter of said container in response to the quantity of flow of liquid through said container; and manually operable means for regulating the communication of said container with said air passage.

3. In an air line lubricator of the class described, adapted for being interposed in an air line and comprising: a lubricant containing bowl, a conduit for delivering lubricant from said bowl to the air line; a vertically disposed container interposed in said delivery conduit and having an inside diameter increasing in size from its lower end to its upper end; and a loose non-buoyant member positioned in said container and moveable to various positions of said container depending upon the flow of liquid through said container.

4. In an air line lubricator of the class described, adapted for being interposed in an air line and comprising: a lubricant containing bowl, a conduit for delivering lubricant from said bowl to the air line, a vertically disposed container interposed in said delivery conduit and having an inside diameter increasing in size from its lower end to its upper end; and a loose non-buoyant member positioned in said container and moveable to various positions of said container depending upon the flow of liquid through said container, said container and said bowl being transparent.

5. In an air line lubricator of the class described, adapted for being interposed in an air line and comprising: a lubricant containing bowl, a conduit for delivering lubricant from said bowl to the air line, a vertically disposed container interposed in said delivery conduit and having an inside diameter increasing in size from its lower end to its upper end; and a loose non-buoyant member positioned in said container and moveable to various positions of said container depending upon the flow of liquid through said container, said container and said bowl being transparent, and said container having formed on its periphery graduations for indicating the position of the indicator within said container.

6. An air line lubricator of the class described, comprising: a transparent bowl; a cap on said bowl having an air passage formed therethrough and communicating through a passage with the interior of said bowl; a vertically disposed container mounted on said cap and depending therefrom and positioned within said bowl, said bowl and said container being transparent, and said container having an inside diameter increasing in size from its lower end to its upper end, said container at its smallest diameter having a passage extended therethrough; a tube communicating at one end with said last named passage and extending at the other end into said bowl and terminating below the normal liquid level thereof; a non-buoyant member loosely positioned in said container and moveable in said container to positions of various inside diameters depending upon the flow of liquid through said container, said container communicating through a passage formed in said head with said air passage; and a manually operable valve for controlling the communication of said container with said air passage.

7. An air line lubricator of the class described, comprising: a transparent bowl; a cap on said bowl having an air passage formed therethrough and communicating through a passage with the interior of said bowl; a vertically disposed container mounted on said cap and depending therefrom and positioned within said bowl, said bowl and said container being transparent, and said container having an inside diameter increasing in size from its lower end to its upper end, said container at its smallest diameter having a passage extended therethrough; a tube communicating at one end with said last named passage and extending at the other end into said bowl and terminating below the normal liquid level thereof; a non-buoyant member loosely positioned in said container and movable in said container to positions of various inside diameters depending upon the flow of liquid through said container, said container communicating through a passage formed in said head with said air passage; and a manually operable valve for controlling the communication of said container with said air passage, said container having graduations formed on its periphery visible through the wall of said bowl.

8. An air line lubricator of the class described, comprising: a transparent bowl; a cap on said bowl having an air passage formed therethrough and communicating through a passage with the interior of said bowl; a bottom on said bowl; and a stud securing said bottom and said cap together and extending diametrically through said air passage.

PARKER G. COX.

REFERENCES CITED

The following references are of record in the file of this patent:

UNITED STATES PATENTS

| Number | Name | Date |
| --- | --- | --- |
| 1,074,867 | Jones | Oct. 7, 1913 |
| 2,187,241 | Kehle | Jan. 16, 1940 |
| 2,223,700 | Norgren | Dec. 3, 1940 |
| 2,304,644 | Heftler | Dec. 8, 1942 |
| 2,439,910 | Snyder | Apr. 20, 1948 |